(No Model.)

E. WALSH, Jr.
WIRED GLASS AND METHOD OF MAKING SAME.

No. 535,035. Patented Mar. 5, 1895.

Witnesses
F. R. Cornwall
Hugh K. Wagner

Inventor
Edward Walsh, Jr.
by Paul Bakewell
his atty.

UNITED STATES PATENT OFFICE.

EDWARD WALSH, JR., OF ST. LOUIS, MISSOURI.

WIRED GLASS AND METHOD OF MAKING SAME.

SPECIFICATION forming part of Letters Patent No. 535,035, dated March 5, 1895.

Application filed October 22, 1894. Serial No. 526,581. (No model.)

*To all whom it may concern:*

Be it known that I, EDWARD WALSH, Jr., a citizen of the United States, residing at the city of St. Louis, State of Missouri, have invented a certain new and useful Improvement in Wired Glass and Method of Making the Same, of which the following is a full, clear, and exact description, reference being had to the accompanying drawings, forming part of this specification, wherein—

Figure 1:
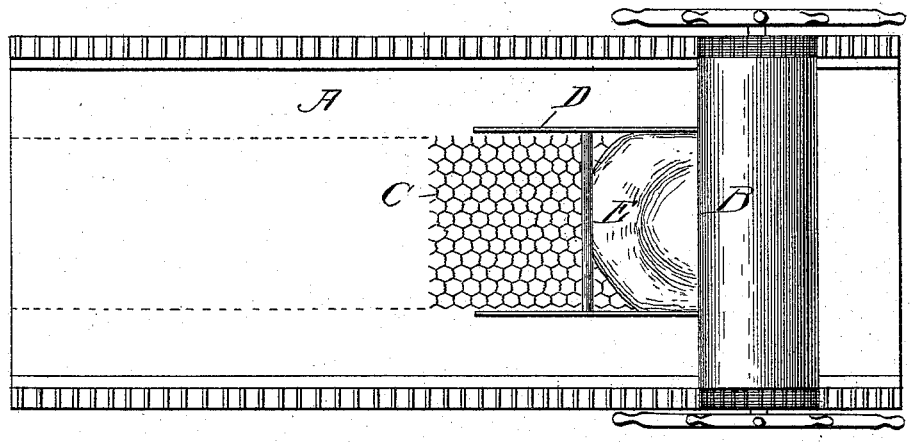
Figure 2:
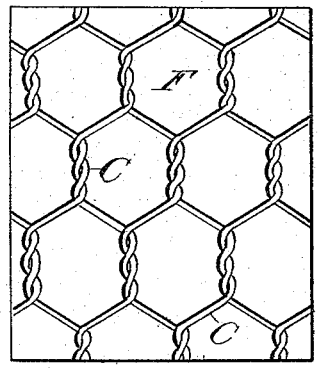
Figure 3:
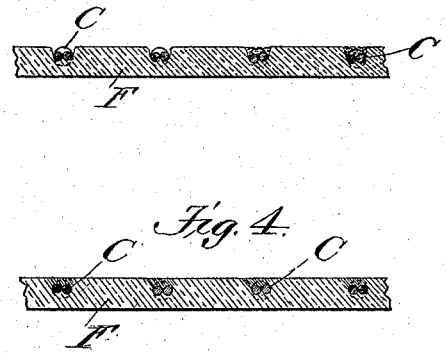
Figure 4:

Figure 1 is a top plan-view of a glass rolling table, illustrating my invention. Fig. 2 is a bottom plan-view of the plate of wired glass, as it first comes from the table. Fig. 3 is a sectional view through the same, illustrating the second step in my process; and Fig. 4 is a cross-sectional view of the finished article.

My invention relates to a new and useful improvement in wired plate glass, and the method for producing the same, the essential characteristics of which may be said to reside in embedding the wire-mesh into one side of the plate of glass during the process of rolling, so as to leave the same free to play thereon, which is due to the difference in the coefficiency of expansion between the wire mesh and glass, and in covering said wire mesh by filling the groove in which the same is embedded with a material which will readily fuse with the glass, and whose coefficiency of expansion is about equal to that of the wire-mesh. The resultant product is a plate of glass composed of materials having different qualities, which will enable the wire mesh to be entirely protected so as to exclude corrosive gases, and which will, also, permit a plate of glass to expand and contract under varying temperatures without danger of cracking.

In the drawings A indicates an ordinary rolling table, and B the roller therefor, which parts are of ordinary construction and need no specific description.

In practicing my invention, I preferably lay upon the table-bed the wire-mesh C, of that class known as hexagonal twist, which form of mesh I find the most convenient by reason of its non-liability to become disarranged. An ordinary gun D straddles the wire-mesh, in which the molten glass E is placed in front of the roller B. The roller B is then moved so as to roll the glass over the wire-mesh, when the first step of my process is completed. The resultant product of this first step is a plate of glass F in one face of which is embedded a wire mesh, as shown in Figs. 2 and 3, the wires composing the mesh being exposed, to the exterior, as shown in Fig. 3.

The second step of my process resides in painting or otherwise introducing over the wired face of the plate or into the grooves in which the wires are embedded, a material whose coefficiency of expansion is about the same as that of the wire-mesh. This material is, preferably, introduced in a liquid state, the vehicle being preferably some volatile fluid, said material being what is known as fusible glass, or a glass which is fusible at a low temperature, or an equivalent thereof. This fusible glass is preferably introduced in a quantity sufficient to fill the grooves and cover the wire-mesh, as illustrated at the right in Fig. 3.

The fusible glass referred to, consists preferably of one hundred parts sand, twenty-seven parts limestone, and twenty parts borax, which are melted into glass form. The product of this is ground finely, or pulverized, and mixed with a suitable volatile vehicle. This fluid mixture is then applied in the manner above described. I have described this as a preferred form of fusible glass, but I do not wish to be understood as confining myself to these ingredients nor the proportions set forth, as there are many other ingredients which could be used, without in the least departing from the nature and principle of my invention.

The third step of my process consists in subjecting the plate of glass, wired and prepared as above described, to an annealing lear, whose temperature is sufficient to fuse the fusible glass, so that it will readily amalgamate with the plate of glass.

A plate of glass thus wired has the advantage of having present and incorporated therewith an agent or material whose coefficiency of expansion is about equal to that of the wire-mesh. Therefore, any disparity between the expansion and contraction of the plate of glass and its embedded wire will be taken up or absorbed by this equalizing agent. Again, this equalizing agent permits, to a certain degree, a play of the wire-mesh in its bed, thereby obviating the pressure which would otherwise be thrust upon the plate of glass and prevents the difference in coefficiency of expansion between the glass and wire-mesh from affecting the plate of glass.

Having thus described my invention, what I claim, and desire to secure by Letters Patent, is—

1. The process herein described for wiring plate glass, which consists in embedding a wire-mesh into one side thereof, during the process of forming the plate, in introducing into the grooves formed by the wires, a fusible compound, and in subjecting the plate so treated to the action of heat, substantially as described.

2. The process herein described for wiring plate glass, which consists in embedding a wire-mesh into one side thereof during the process of forming the plate, introducing into the grooves formed by the wire a fusible compound, which covers the same, and is flush with the face of the plate of glass, and finally subjecting the plate of glass so treated to the action of heat whereby the compound introduced into the grooves is fused and amalgamated with the original plate of glass, substantially as described.

3. A plate of glass in which is embedded a wire-mesh, said wire-mesh being covered or protected from the exterior by a material whose coefficiency of expansion is about equal to that of the wire-mesh, substantially as described.

4. As a new article of manufacture, a plate of glass in which is embedded a wire-mesh, said plate of glass having amalgamated therewith to one side of said mesh a material flush with the surface of said plate, the coefficiency of expansion of which material is about equal to that of the wire mesh, substantially as described.

In testimony whereof I hereunto affix my signature, in presence of two witnesses, this 4th day of October, 1894.

EDWARD WALSH, JR.

Witnesses:
F. R. CORNWALL,
HUGH K. WAGNER.